United States Patent [19]
Elrod

[11] 3,944,379
[45] Mar. 16, 1976

[54] CUTTING APPARATUS

[76] Inventor: Fred S. Elrod, James Island, S.C.

[22] Filed: Nov. 19, 1973

[21] Appl. No.: 417,198

[52] U.S. Cl. .................. 408/79; 279/16; 408/112;
                                      408/196; 408/204
[51] Int. Cl. ............................................ B23b 41/00
[58] Field of Search ........ 82/4 E, 45; 408/201, 196,
                                      408/186, 79, 112; 279/16

[56] References Cited
UNITED STATES PATENTS

| 182,744 | 10/1876 | Bowen | 408/196 X |
|---|---|---|---|
| 1,377,663 | 5/1921 | Brown et al. | 279/16 |
| 1,424,535 | 8/1922 | Watts | 279/16 |
| 1,469,500 | 10/1923 | De Long | 279/16 |
| 1,823,032 | 9/1931 | De Vlieg | 279/16 |
| 3,364,798 | 1/1968 | Girardin | 279/16 |

*Primary Examiner*—Andrew R. Juhasz
*Assistant Examiner*—W. R. Briggs
*Attorney, Agent, or Firm*—T. Russell Foster

[57] ABSTRACT

Apparatus for cutting work provided with centering means and supported adjacent a housing drivably mounted for rotation on a frame, the housing being arranged to support a floating, cutting assembly having a cutting head and centering means for initial alignment with the centering means on the work and subsequent cutting of the metal by the cutting head to remove an annular portion of material from the work.

8 Claims, 8 Drawing Figures

CUTTING APPARATUS

This invention relates to cutting apparatus and more specifically to apparatus for cutting an annular groove in a metal article.

In the machining of metal and the like, it has long been known to utilize a tool comprising a circular cutter and a coaxially positioned yieldable center. In such a tool, the center is arranged to engage a suitably punched hole or recess in the work and then be moved rearwardly for subsequent engagement of the driven circular cutter with the work to accurately cut the work along a concentric, circumferentially extending path. While such a tool produces satisfactory results when the center is aligned with the centering means on the work such an alignment is a time consuming operation requiring a high degree of skill with the use of present day machines. The difficulty of such an alignment is due to the conventional arrangement for the cutting tool on the machine which permits the cutting tool to be mounted for rotation in only one axial position. As a result, the work must be positioned on the machine in a precise position with its centering means in exact alignment with the center on the cutting tool, an extremely difficult operation with some degree of misalignment however, slight, usually present regardless of the time and skill utilized. One type of operation which requires such precise alignment and to which the invention is particularly adaptable is for the removal of an annular metal seal disposed in the end face of an artillery shell between the shell body and a screw threaded end cap for closing an access opening in the shell end wall. Recesses are provided in the end cap for engagement with a cutting tool center associated with a circular cutter so that when exact alignment is obtained, the annular ring only is removed by the cutter. This precise machining operation has been carried out with some degree of success with present day cutting apparatus but only with apparatus which is extremely complicated and expensive in construction.

Accordingly, a primary object of this invention is to provide a new and novel cutting apparatus.

Another object of this invention is to provide a new and novel cutting apparatus in which alignment between a cutting tool and the work to be cut is automatically obtained.

A further object of this invention is to provide a new and novel cutting apparatus for removal of an annular metal seal from artillery shells in a highly accurate and precise manner.

A still further object of this invention is to provide a new and novel cutting apparatus for removing a circular portion of material from work which is extremely simple and inexpensive in construction and which is self-aligning so as to permit cutting operations on work to be carried out at a high production rate but in a highly accurate manner and with use of operators of relatively low skill.

This invention further contemplates the provision of a self-aligning cutting tool having a yieldable center and a circular cutter which are arranged in a floating manner for automatic alignment with work to be cut.

Other objects and advantages of this invention will become apparent from the following description taken in connection with the accompanying drawings.

The objects stated above and other related objects are accomplished by the provision of a frame having driving means and means for supporting work having centering means in a cutting position. A cutting assembly having a housing is mounted on the frame for rotation of the housing by the driving means and the cutting assembly includes a cutting head having a cutting tool positioned thereon supported on the housing for universal radial movement and for rotation with the housing. A non-rotatable elongated rod member extends axially through the housing and the cutting head in coaxial relationship with the head and is provided with centering means adjacent the cutting tool. The rod member is arranged to rotatably support the cutting head throughout the universal radial movement of the head so that as the cutting assembly is moved into an operative position, the centering means on the rod member engages the centering means on the work for subsequent cutting engagement by the cutting tool with the work in the proper position.

The novel features which are believed to be characteristic of the invention are set forth with particularity in the appended claims. The invention itself, however, both as to its organization and method of operation may be best understood by reference to the following description taken in conjunction with the accompanying drawings in which:

Figure 1:
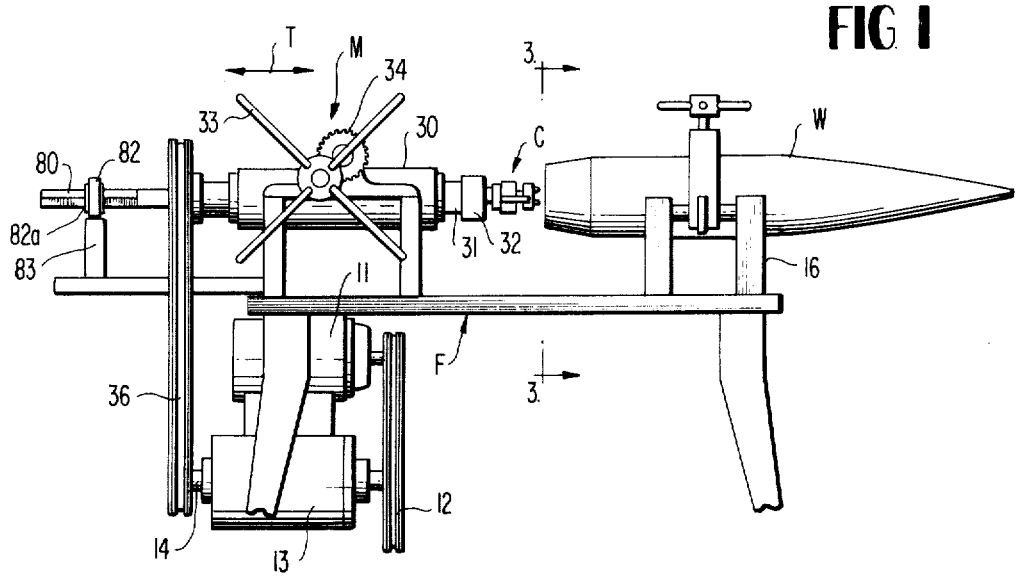
FIG. 1 is a side elevation view of cutting apparatus constructed in accordance with the invention.
Figure 2:
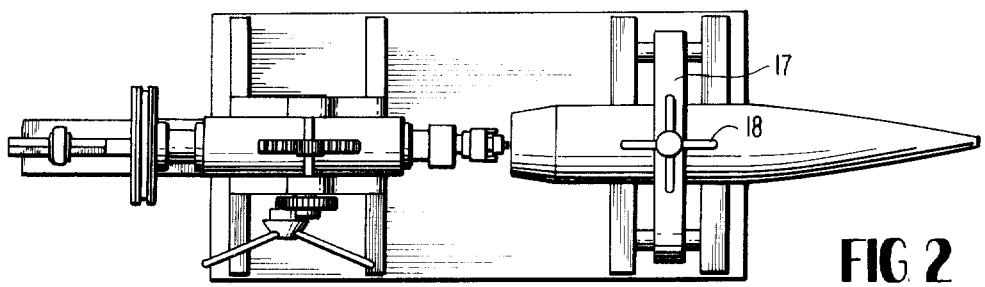
FIG. 2 is a plan view of the apparatus of FIG. 1.

Referring now to the drawings there is shown apparatus constructed in accordance with the invention and designated generally by the letter M. The apparatus M includes a frame F provided with drive means such as a motor 11 connected by means of a belt 12 to a gear reducer 13 having an output shaft 14. Means are provided for supporting work to be cut preferably work of the type provided with centering means and, in the illustrated embodiment, the work comprises an artillery shell W supported on a cradle 16 and clamped in the position shown by means of clamping device 17 provided with a manual operating lever 18.

Figure 3:
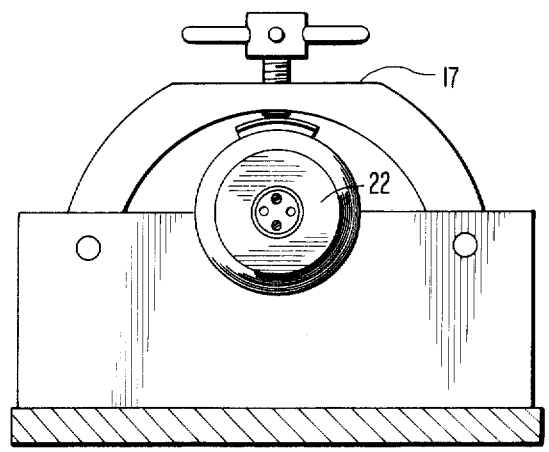
FIG. 3 is an enlarged sectional view taken substantially along line 3—3 of FIG. 1 in the direction of the arrows.
Figure 4:
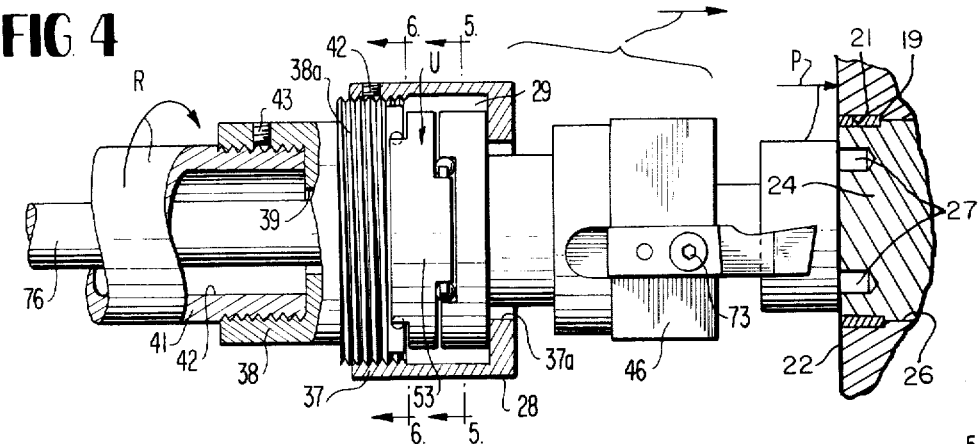
FIG. 4 is an enlarged view, partially in section, of a portion of the apparatus of FIG. 1 showing the parts in an intermediate operating position.

It should be understood that although the cutting apparatus of the invention is used to cut any suitable type of work, it is particularly suitable for cutting out an annular member such as a ring seal 19 of metallic material disposed within a groove 21 in the end wall 22 of the shell W as shown best in FIGS. 3, 4. The ring 19, which is usually formed of copper or the like, forms a seal between the shell body and a screw-threaded end cap or closure 24 disposed within an access opening 26 in the shell end wall 22. As is well known, the sealing ring 19 deteriorates during storage and therefore must be periodically replaced, the most typical method of replacement involving the cutting out of the seal for replacement with a new ring. Furthermore, the end cap 24 is provided with centering means, which in the illustrated embodiment, comprise a pair of recesses 27 which would normally be employed to accommodate portions of a spanner wrench or the like for removing and replacing the end cap 24.

As particularly illustrative of the invention, the apparatus M includes a cutting assembly designated generally by the letter C which includes a housing 28 having an interior 29 and means are provided for mounting the housing 28 on the frame F for rotation by the driving means or motor 11. More specifically, the apparatus M includes a headstock 30 in which a shaft 31 is suitably mounted for rotation and for axial movement forwardly and rearwardly in the direction of the double arrow T. The shaft 31 is provided with a chuck 32 on its forward end and the shaft 31 is preferably moved by means of a manual operating lever 33 through gears 34. The rear end of the shaft 31 is arranged to be drivably connected to the drive means or motor 11 by suitable means such as a belt and pulley arrangement 36.

The housing 28 includes a body portion 37 having an opening 37a in its front wall the rear of the body portion 37 being open to accommodate a connector member 38 having an enlarged, externally threaded portion 38a and a central bore 39. An extension member 41 having a central bore 42 is threadedly connected to the connector member 38 and is arranged to be clamped in the conventional manner in the chuck 32 for rotation by the driving means or motor 11 in the direction of the arrow R. Preferably, the members 38,41 are secured to the body portion 37 in the position shown in FIG. 1 by means of set screws 42,43 respectively.

The cutting assembly C also includes a cutting head 46 having a central bore 47 and means are provided for supporting the cutting head 46 on the housing 28 for universal radial movement and for rotation with the housing. More specifically, a coupling designated generally by the letter U is disposed within the interior 29 of the housing 28. In the construction of the coupling U, the end wall 48 of the connector member 38 adjacent the enlarged end portion 38a is provided with a transversely extending raised portion 51 which is arranged to be slidably accommodated within a groove 52 on one side of an intermediate member 53. The intermediate member 53 is provided with a central bore 54 as shown best in FIG. 8.

Figure 8:
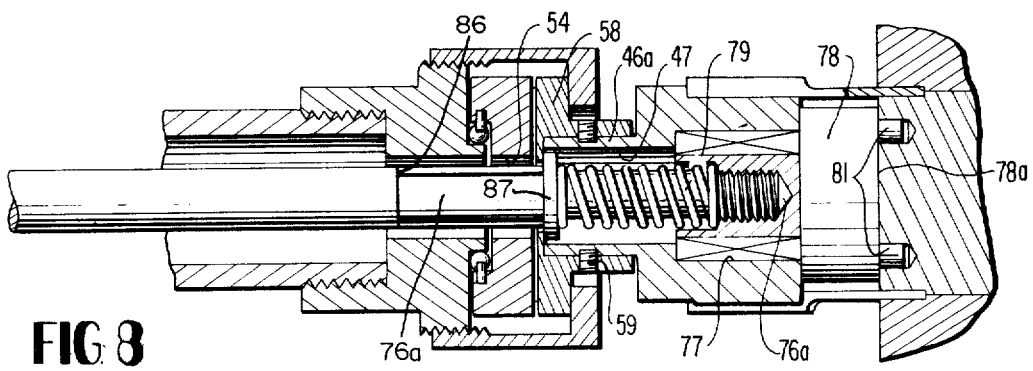
FIG. 8 is a sectional view similar to FIG. 7 showing the parts in a final operative position during the cutting operation.

The other side of the intermediate member 53 is provided with a raised portion 56 extending perpendicularly to the axis of the groove 52 and raised portion 56 is arranged to be slidably accommodated within a groove 57 in the end wall of a flanged sleeve member 58 suitably secured to a necked-down portion 46a of the cutting head 46. As shown in FIG. 8, it will be seen that the flanged sleeve member 58 is removably secured by means such as set screws 59 to the necked-down portion 46a on the cutting head 46 and extends through the housing opening 37a in spaced relationship therewith.

Figure 5:
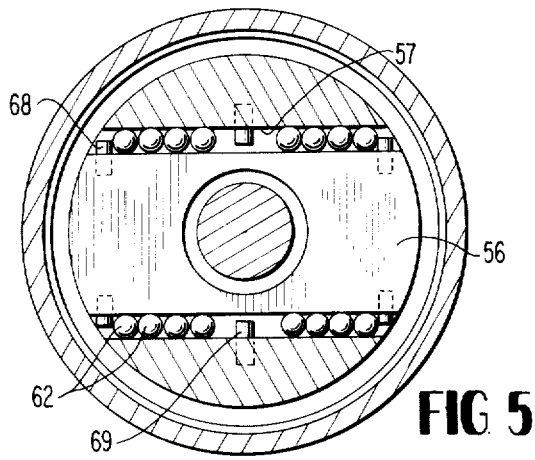
FIG. 5 is an enlarged sectional view taken substantially along line 5—5 of FIG. 4 in the direction of the arrows.
Figure 6:
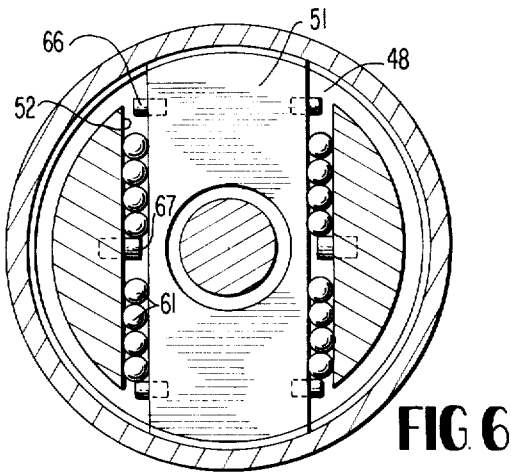
FIG. 6 is an enlarged sectional view taken substantially along line 6—6 of FIG. 4 in the direction of the arrows.

As will be noted in FIGS. 5, 6, the width of the raised portions 51,56 is slightly less than the width of the grooves 52, 57 to accommodate bearing means such as ball bearings 61,62 respectively so as to provide bearing surfaces for the relative sliding movement between the connector member 38, intermediate member 53 and sleeve member 58. Preferably, pins 66,67 and pins 68,69 are provided in selected positions on the raised portion 51 and groove 52 and raised portion 56 and groove 57 for retaining the ball bearings 61,62 in position.

Cutting tool means are supported on the cutting head 46 which, in the illustrated embodiment, preferably comprise a pair of diametrically opposed, circular cutters 71,72 secured by means such as set screws 73 to the outer periphery of the cutter head 46 and extending forwardly therefrom. The cutters 71,72 are selected so as to cut the material forming the ring seal 19 in the cutting position as described hereinafter and as a result in the precise alignment of the cutting tool with the novel arrangement of the invention only the material of the ring seal is removed.

The cutting assembly C includes an elongated rod member 76 which extends through the central bores 42,39 of the members 41,38, the housing interior 29, the central bore 54 of the intermediate member 53 and the central bore 47 of the cutting head 46 in coaxial relationship with the cutting head 46 as shown best in FIG. 8. The rod member 76 is arranged to support the cutting head 46 rotatably in coaxial relationship throughout the universal radial movement permitted by the coupling U and accordingly a bearing sleeve 77 is provided between the rod member 76 and cutting head 46. As shown in FIG. 8, the rod member 76 is disposed in spaced relationship with the central bores 39,42 of the connector and extension members 38,41 and central bore 54 of the intermediate member 53 respectively so as to accommodate the rod member 76 during the universal radial movement of the cutting head 46 together with the forward end 76a of the rod as permitted by the coupling U.

Centering means are provided on the forward end of the rod member 76 adjacent the cutting tool means 71,72 for centering engagement with the centering means or recesses 27 on the work W. In the preferred embodiment, the centering means include a center member 78 preferably yieldingly urged forwardly by means of spring 79 in the direction of the arrow P in front of the cutting tools 71,72 in the normal position. The forward end wall 78a of the center member 78 is provided with a pair of pins 81 suitably spaced so as to be accommodated within the recesses 27 of the work W.

Means are provided on the frame F for retaining the rod member 76 against rotation. More specifically, as shown best in FIG. 1, the rear end portion of the rod 76 is provided with a portion 80 of polygonal cross-sectional shape which is slidably but non-rotatably accommodated within a sleeve 82 having a central opening 82a of polygonal shape corresponding to the rod portion 80. The sleeve 82 is suitably mounted on the frame F by means such as a stand 83. The sleeve 82 thus permits axial movement in the direction of the arrow T but retains the rod member 76 against rotation.

In the operation of the invention, the work W such as an artillery shell is positioned in the clamp 17 and held in a preselected position by manipulating the clamping lever 18. In the position of FIG. 1, the end wall 22 of the work W faces the cutting assembly C and the cutting assembly is moved in the direction of the work W by manipulation of the operating lever 33. As the clamping assembly C moves towards the work W the pins 81 on the center member 78 move into the recesses 27 and nest precisely therein regardless of any slight misalignment between the cutting assembly C and work W as a result of the floating action of the cutting head 46 and the center member 78 permitted by the coupling U as the parts of the coupling slide relative to each other.

Figure 7:
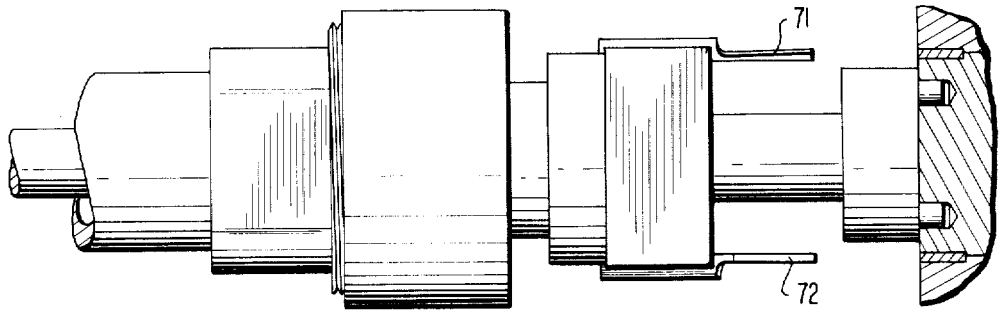
FIG. 7 is a view similar to FIG. 4 showing the parts in an initial operative position.

As the cutting assembly C continues its movement in the forward direction, the cutting head 46 with the cutters 71,72 move forwardly relative to the center member 78 as permitted by the spring 79 until cutting engagement between the cutters 71,72 and the ring seal 19 is obtained, the drive means or motor 11 being actuated to rotate the housing 28 and the cutting head 46 supported in the chuck 32. As a result of the precise coaxial relationship between the center member 78 and cutters 71,72, the cutting head 46 rotates on the rod member 76 and the rod member is held against rotation by the sleeve 82 so that the cutters remove precisely the material of the ring seal 19 only without cutting engagement between either the body of the shell or work W and the cap 24. After removal of the ring seal 19, the cutting assembly C is moved in the opposite direction permitting the center member 78 to move outwardly into the position of FIG. 7 under the action of spring 79, stop means such as a shoulder 86 on the necked-down portion 76a on the shaft 76 being provided for engagement with a washer 87 to limit the outward movement of the cutting assembly C.

While there has been described what at present is considered to be the preferred embodiment of the invention, it will be understood by those skilled in the art that various changes and modifications may be made therein without departing from the invention.

I claim:

1. Apparatus for cutting work having centering means comprising, in combination, a frame, driving means on said frame, means for supporting said work in a selected position on said frame, a cutting assembly including a housing having an interior, means for mounting said housing on said frame for rotation by said driving means, a cutting head having a central bore, means for supporting said cutting head on said housing for universal radial movement and for rotation with said housing and cutting tool means supported on said cutting head, an elongated rod member extending through said housing and said cutting head central bore in coaxial relationship with said cutting head, said rod member being arranged to rotatably support said cutting head in said coaxial relationship throughout said universal radial movement, centering means on the end of said rod member adjacent said cutting tool means for centering engagement with said centering means on said work, means on said frame for retaining said rod member against rotation and means on said frame for moving said cutting assembly into operative position with said centering means on said rod member and said work in said centering engagement and with said cutting tool means in cutting engagement with said work.

2. A cutting apparatus in accordance with claim 1 wherein said centering means on said rod member is disposed in a position forwardly of said cutting tool means and including yieldable means for supporting said rod member centering means for axial movement rearwardly of said cutting means in the operative position of said cutting assembly.

3. A cutting apparatus in accordance with claim 2 wherein said yieldable means comprise a spring on said rod member for urging said centering means forwardly and including stop means for limiting the forward movement of said centering means to said forwardly disposed position.

4. A cutting apparatus in accordance with claim 1 wherein said means for supporting said cutting head comprise an intermediate member having end walls, one of said end walls having a transversely extending groove and the other of said end walls having a transversely extending raised portion disposed in perpendicular relationship with said groove on said one end wall, said housing and said cutting head being provided with a transversely extending raised portion and a transversely extending groove for slidably accommodating the adjacent raised portion and groove of the adjacent end wall of said intermediate member to permit said universal radial movement of said cutting head.

5. A cutting apparatus in accordance with claim 4 wherein said means for supporting said cutting head includes bearing means between said grooves and said raised portions.

6. A cutting apparatus in accordance with claim 5 wherein said work is provided with an end wall having an annular groove, an annular member disposed in said annular groove and wherein said centering means on said work comprises a pair of diametrically opposed recesses within the inner portion of said end wall defined by said annular groove and wherein said centering means on said rod member comprises a pair of diametrically opposed pins arranged to be accommodated with said recesses in the operative position of said cutting assembly for maintaining alignment of said cutting tool means with said annular member during said cutting operation.

7. A cutting apparatus in accordance with claim 6 wherein said cutting tool means comprise a pair of diametrically opposed circular cutters mounted on said cutting head in concentric relationship with said centering means on said rod member.

8. A cutting apparatus in accordance with claim 7 wherein said means for retaining said rod member against rotation include a portion of polygonal cross-sectional shape adjacent the rear end of said rod member and a sleeve having an opening of polygonal shape for accommodating said rod member rear end portion in sliding, non-rotatable relationship.

* * * * *